United States Patent [19]

Mischiatti

[11] 4,398,501
[45] Aug. 16, 1983

[54] SYSTEM FOR RECOVERING LATENT AND SENSIBLE HEAT OF EFFLUENT GASES FROM A MELTING INSTALLATION

[75] Inventor: Mario Mischiatti, Como, Italy

[73] Assignees: Costruzioni Meccaniche F.B.M.S.p.A.; Teksid S.p.A., both of Italy

[21] Appl. No.: 283,880

[22] Filed: Jul. 16, 1981

[30] Foreign Application Priority Data

Jul. 24, 1980 [IT] Italy ............................. 23682 A/80

[51] Int. Cl.³ .............................................. F22D 1/00
[52] U.S. Cl. ................................. 122/7 R; 122/1 R; 122/16; 122/42; 122/130
[58] Field of Search ................ 122/53, 130, 1 R, 16, 122/367 C, 42, 43, 7 R

[56] References Cited

U.S. PATENT DOCUMENTS

| | | |
|---|---|---|
| 493,376 | 3/1893 | Eaves ............................. 122/367 C |
| 931,907 | 8/1909 | Wegener ............................. 122/130 |

FOREIGN PATENT DOCUMENTS

| | | |
|---|---|---|
| 1141646 | 4/1960 | Fed. Rep. of Germany . |
| 2942609 | 5/1980 | Fed. Rep. of Germany . |
| 884640 | 5/1943 | France . |
| 53665 | 3/1946 | France . |
| 940174 | 5/1948 | France . |
| 1228730 | 3/1960 | France . |
| 2434335 | 3/1980 | France . |
| 948144 | 1/1964 | United Kingdom . |

*Primary Examiner*—Edward G. Favors
*Attorney, Agent, or Firm*—McGlew and Tuttle

[57] ABSTRACT

System for recovering latent and sensible heat of effluent gases from a cupola for cast iron production or other similar melting installation consequent intermittent operation thereof, for obtaining heat energy or potential electric energy in the form of hot water and/or steam, comprising a thermal unit including an air burner and combustion chamber for burning the effluent gases to form hot combustion gases, two vertical waste heat boilers disposed in series along a flow path downstream of the combustion chamber, the first being a water tube boiler and the second being a fire tube boiler, both having vertical tubes arranged so that the hot gases pass upwardly through the water tubes, thereby licking such tubes, and upon flow reversal thence pass downwardly through the fire tubes, thereby enhancing the self-cleaning thereof, an economizer and optionally a combustion air preheater downstream of the second boiler, and a chimney for the fumes at the end of the flow path, as well as a common external steam separator above the boilers and remote from the flow path for recovering steam from and returning water to each of the boilers, plus a vertical tube superheater connected to the steam separator and including a section inside the top part of the first boiler and/or a section between the two boilers, for supplying superheated steam to an electric energy generating turbine, with recycling thereof as feed water to the thermal unit via the economizer.

14 Claims, 1 Drawing Figure

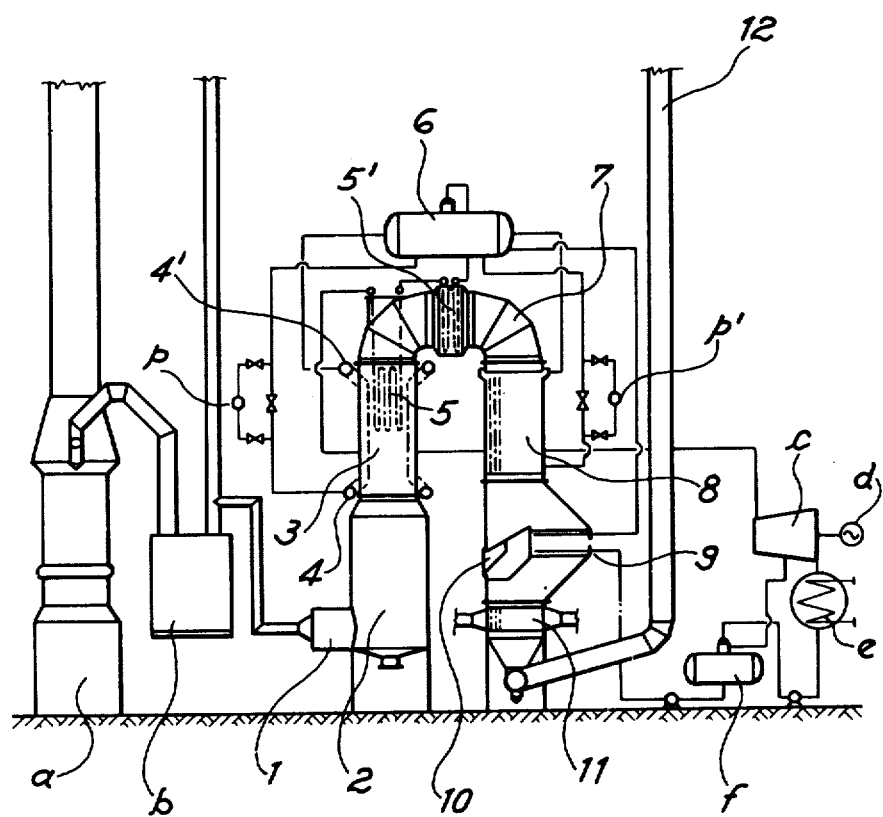

SYSTEM FOR RECOVERING LATENT AND SENSIBLE HEAT OF EFFLUENT GASES FROM A MELTING INSTALLATION

BACKGROUND OF THE INVENTION

This invention relates to a system for recovering latent and sensible heat of effluent gases from a cupola for cast iron production, or from other similar melting installation, for the purpose of obtaining electric and/or heat energy in the form of steam and/or hot water.

In melting installations, including cupolas for cast iron production, the effluent gases contain latent and sensible heat. Since melting installations such as cupolas can have intermittent operation characterized by halts or periods of non-use, including daily halts or periods of non-use, and since their effluent gases contain dust and in some cases steam and/or drops of water, and therefore possessing potentially fouling and corrosive properties, it follows that the recovery of such latent and sensible heat from the above-mentioned gases involves certain difficulties.

SUMMARY OF THE INVENTION

It is an object of the present invention to overcome the foregoing difficulties and to provide a system to recover the latent and sensible heat contained in the effluent gases of melting installations, including cupolas for cast iron production, in order to produce heat and/or potential electric energy in the form of hot water and/or steam which may be superheated for electric energy generation purposes when so required or desired.

For this purpose, that is to say, for the elimination of such difficulties, the present invention contemplates a system consisting of a thermal unit for heat recovery with consequent production of steam and/or hot water and a converter unit which transforms the heat energy into electric energy when so requested or desired.

The present invention particularly consists of a first subsystem or thermal unit and another or second subsystem or electric unit for converting the heat energy into electric energy, when so requested or desired.

Briefly, the characteristic part of the system of the present invention actually consists of just its thermal unit only, which advisably consists of two interconnected boilers, of which the first one is of the water tube type functioning by radiation and convection heat transfer, with two round, e.g. externally encircling, manifolds, and the second one is of the fire tube type with smooth or non smooth, e.g. finned, internal surfaces. The superheater for producing superheated steam, e.g. for the electric energy converter unit, is made up preferably of two sections, e.g. in series, the first one of which is separately installed in the gas flow path inside the top part of the first boiler, while the second section is separately installed in the gas flow path between the two boilers. The contemplated steam separator is common to both boilers and is installed externally above them and remote from the gas flow path.

Additionally, an economizer and optionally a combustion air preheater are desirably installed downstream to the second boiler in the gas flow path. The fumes are then sent to the chimney. When electric energy is to be produced, the steam from the superheater is sent to a turbine and is returned to the thermal unit as feed water via the economizer.

In this regard, a first characteristic of the system in accordance with the invention is that a thermal unit is provided essentially consisting of a pair of waste heat boilers both vertical, of which the first one is of the water tube type and the second is of the fire tube type, with a common steam separator connected to and installed above these boilers.

A second characteristic of the system in accordance with the invention is that a water tube boiler is provided, functioning by radiation and convection heat transfer having two round manifolds, the first one of which is designed to distribute water in the vertically arranged tubes along one or more peripheral circumferences, while the second one collects the mixture of water and steam from above and conveys it by means of suitable piping to the steam separator, all this leaving the central part of the boiler free in the lower zone and consequently the heat transfer surfaces are exposed to fouling only to a limited degree.

A third characteristic of the system in accordance with the invention is that the lower part of the above mentioned water tube boiler functioning by radiation and heat transfer, forms in actual fact the end part of the combustion, chamber hence guaranteeing improved combustion efficiency.

A fourth characteristic of the system in accordance with the invention consists in the provision—when electric energy is to be produced—of a superheater, with vertical, and therefore better supported tubes, consisting of two sections, of which the first one is installed inside the top part of the first boiler, and the second one is installed between the two waste heat boilers.

Of these two sections, the first, placed in the water tube boiler, permits convective heat transfer to take place, as heat transfer by radiation is less efficient at this point. The shape of the second section is such as to permit automatic discharge of dust by gravity.

A fifth characteristic of the system in accordance with the invention is that the two water tube and fire tube boilers are arranged in series so as to permit the gases which pass through them, to flow from bottom to top in the water tube boiler, licking said tubes, and from top to bottom in the fire tube boiler with consequent self cleaning of the tubes.

A sixth characteristic of the system in accordance with the invention is that the fire tubes are either smooth or finned on the inside, according to the degree of contamination of the gases, but they are at any rate less subject to deposition of dust in them or scaling because, as said previously, the gases flow inside them from top to bottom, and hence they are easily cleanable by blowing or by mechanical means.

A seventh characteristic of the system in accordance with the invention consists in the provision of an economizer and, when necessary, a preheater for the combustion air for the gases, arranged so as to permit subsequent vertical flow through them from top to bottom, and preferably staggered, in order to permit self cleaning and, at the same time, to avoid deposition of dusts in said apparatus from the fire tube boiler.

BRIEF DESCRIPTION OF THE DRAWING

These main characteristics and other ones of lesser importance will appear clear from the following further description with reference to the accompanying drawing, given as an exemplification of the principles of the invention, without limitation, illustrating a preferred embodiment of the system in accordance with the invention.

DETAILED DESCRIPTION OF THE INVENTION

As can be seen from the drawing, the system consists of, and is characterized by, a thermal unit comprising various pieces of apparatus denoted by progressive reference numbers, further completed by other well known apparatus installed upstream and downstream to said thermal unit, designated by small letters.

More precisely in the figure, there is a burner denoted by 1 with relative combustion chamber 2, while 3 designates a water tube waste heat boiler functioning by radiation and convection heat transfer which is provided with round, e.g. externally encircling, manifolds 4, 4', one designed to distribute the water in the vertically arranged tubes along one or more peripheral circumferences, and the other to collect the water and steam mixture from the top and convey it to steam separator 6 through suitable piping.

Hence the central part of the lower zone in the boiler is free, and therefore in actual fact forms an extension of combustion chamber 2, and the outer surfaces of the tubes, that is to say, those involved in the heat transfer, are only exposed to a limited degree to fouling by the effluent gases which lick them when flowing towards the top.

The system also comprises, when electric energy is to be produced, a superheater which is likewise (see drawing) preferably make up of two separate, e.g. series connected, sections 5 and 5', both with vertical, and therefore better supported, tubes, of which the first section 5 is separately installed inside the upper part of the water tube waste heat boiler 3, and the second section 5' is separately installed between the two waste heat boilers 3 and 8.

Of these two sections, the first, denoted by 5, permits convective heat transfer to take place as heat transfer by radiation at that point of boiler 3 is less efficient.

The second section 5' of the superheater is, in turn, connected relatively to the two boilers 3 and 8 by means of, e.g. inverted U-shaped or arcuate transitional intermediate flow path type, reverse flow piping 7 which permits automatic discharge of the dusts by gravity.

Connected in series with the first water tube boiler 3 is, as aforesaid, a second fire tube boiler 8, and the gases, which pass along the gas flow path from the combustion chamber 2 through them, flow in the first one from bottom to top, while in the second one they flow from top to bottom, licking the water tubes on the outside in the first boiler, and flowing inside the fire tubes of the second boiler with consequent self cleaning of the latter.

The water is conveyed to the second fire tube boiler 8 from the external steam separator 6, disposed in remote spaced relation to the gas flow path, and the generated steam is conveyed from such fire tube boiler 8 back to the steam separator 6, through suitable piping, as shown in parallel with the piping of pump p', i.e. in a corresponding separate and independent water and steam flow circuit between the second boiler 8 and the steam separator 6 analogous to the separate and independent corresponding water and steam flow circuit between the first boiler 3 and the steam separator 6.

On the other hand, the hot combustion gases pass upwardly along the first vertical flow portion of the gas flow path containing the water tube boiler 3, thence more or less arcuately crosswise through the intermediate upper interconnecting transitional flow portion of the flow path, e.g. containing the vertical steam superheater tubes of the intermediate superheater section 5', and thereafter downwardly along the second vertical flow portion of the flow path containing the fire tube boiler 8, for independent heat recovery operation in each such boiler as shown.

The internal walls of the fire tubes can be smooth or finned; they are in all cases less subject to deposition of dusts on their walls or to scaling as in them the direction of flow of the gases is towards the bottom, and hence they are easy to clean either by blowing or by mechanical means.

Naturally the system can undergo many variations, and superheater 5, 5' can also be provided in one section, and can be located in either one of the two positions designated.

The original thermal unit is completed by economizer 9 with side dust discharge 10 and combustion air preheater 11.

The fumes at the preheater 11 outlet are conveyed to chimney 12. If combustion air preheater 11 is not required, the fumes are directly conveyed from economizer 9 to chimney 12.

As can be seen in the preferred embodiment of the invention illustrated in the FIGURE, the direction of flow of the gases through the economizer 9 and air preheater 11 is from top to bottom, and these items are staggered, hence ensuring a self cleaning action, as well as minimum deposition of any dust which may still come in from boiler 8.

For the purpose of completion, there is illustrated in the drawing cupola a for cast iron production, upstream to the thermal unit.

The system in accordance with the invention is designed to recover the latent and sensible heat from the effluent gases of this cupola.

The letter b denotes a dust collecting apparatus. The letters p, p' denote two pumps to aid circulation if required.

As is clear from the foregoing, obviously instead of a cupola for cast iron production, any other similar melting installation could likewise be provided.

Lastly, downstream to the thermal unit, there is represented a set of already known equipment designed to transform, when specifically requested or desired, the heat energy obtained from the thermal unit due to the production of steam, into electrical energy.

This converter set substantially consists of a turbine c, an alternator d, a condenser e and a degasser f.

In this case, the steam from superheater 5, 5' is conveyed to turbine c and is returned to the thermal unit in the form of feed water in economizer 9 via degasser f.

As emphasized more than once, and as is obvious to a person skilled in the art, that which has been illustrated and described represents a preferred embodiment of the system in accordance with the invention.

Other variations may however be carried out to the actual system, some of which have already been pointed out in the description without departing from the true spirit of the present invention which in fact includes them all and which is defined by the following claims.

I claim:

1. System for recovering latent and sensible heat of effluent gases from a cupola for cast iron production or from other similar melting installation consequent intermittent operation thereof, for obtaining heat energy or potential electric energy in the form of hot water and/or steam, which comprises a thermal unit and a superheater for producing superheated steam capable of converting the heat energy into electric energy, the thermal unit including a combustion air burner and a combustion chamber arranged for burning such effluent gases with combustion air to form hot combustion gases therefrom, two vertical waste heat boilers arranged for independent heat recovery operation and disposed in series along a flow path successively downstream of the burner and combustion chamber for receiving in turn the hot combustion gases from the combustion chamber, the first of said boilers being of the water tube type having vertically arranged water tubes and the second of said boilers being of the fire tube type having vertically arranged fire tubes, and the flow path having a first vertical flow portion containing such water tubes, a second vertical flow portion containing such fire tubes and an intermediate upper interconnecting transitional reverse flow portion between the first and second vertical flow portions for thereby permitting the hot combustion gases flowing along the flow path through the two boilers to flow in an upward direction from bottom to top in the water tube boiler so as to lick the water tubes thereof, thence through the upper interconnecting reverse flow portion and in turn to flow in a downward direction from top to bottom in the fire tube boiler so as to enhance the self-cleaning of the fire tubes thereof, and a common external steam separator installed above the two boilers and in remote spaced relation to the flow path and operatively respectively connected to the two boilers for correspondingly receiving steam therefrom and returning water thereto.

2. System of claim 1, wherein the fire tubes of the fire tube boiler are provided with a smooth internal surface.

3. System of claim 1, wherein the fire tubes of the fire tube boiler are provided with a non-smooth internal surface capable of being cleaned by blowing or mechanical means.

4. System of claim 3, wherein the fire tubes of the fire tube boiler are provided with a finned internal surface capable of being cleaned by blowing or mechanical means.

5. System of claim 1, wherein the water tube boiler is arranged to function by radiation and convection heat transfer, being provided with external round manifolds for this purpose, including a first such manifold disposed to distribute water in the vertically arranged water tubes along one or more peripheral circumferences and a second such manifolds thereabove and disposed to collect the resulting water tube boiler produced mixture of steam and water at the top of the water tubes and convey it to the steam separator, such arrangement being disposed such as to leave free the central portion of the lower portion of the first vertical flow portion containing the water tubes of the water tube boiler and thereby to form in such lower portion an extension to the combustion chamber for improving the combustion efficiency thereof and also to provide water tube heat transfer surfaces which are consequently only exposed to fouling to a limited degree.

6. System of claim 5, wherein the superheater is in the form of a steam superheater operatively connected to the steam separator and having vertically arranged superheater tubes forming a central superheater section separately installed inside the top portion of the water tube boiler at the corresponding central portion of the upper portion of the first vertical flow portion of the flow path, for permitting primarily convective heat transfer and secondarily radiant heat transfer to the superheater tubes thereat.

7. System of claim 5, wherein the superheater is in the form of a steam superheater operatively connected to the steam separator and having vertically arranged superheater tubes forming an intermediate superheater section separately installed between the two waste heat boilers in the intermediate upper interconnecting transitional reverse flow portion of the flow path, for permitting heat transfer to the superheater tubes thereat.

8. System of claim 5, wherein the superheater is in the form of a steam superheater operatively connected to the steam separator and having vertically arranged superheater tubes forming two series connected sections, including a first central superheater section separately installed inside the top portion of the water tube boiler at the corresponding central portion of the upper portion of the first vertical flow portion of the flow path, for permitting primarily convective heat transfer and secondarily radiant heat transfer to the central section superheater tubes thereat, and a second intermediate superheater section separately installed between the two waste heat boilers in the intermediate upper interconnecting transitional reverse flow portion of the flow path, for permitting heat transfer to the intermediate superheater tubes thereat.

9. System of claim 1, wherein the superheater is in the form of a steam superheater operatively connected to the steam separator and having vertically arranged superheater tubes forming an intermediate superheater section separately installed between the two waste heat boilers in the intermediate upper interconnecting transitional reverse flow portion of the flow path, for permitting heat transfer to the superheater tubes thereat.

10. System of claim 1, wherein the superheater is in the form of a steam superheater operatively connected to the steam separator and having vertically arranged superheater tubes separately installed in the flow path upstream of the fire tube boiler, and the thermal unit further includes an economizer arranged in the second vertical flow portion of the flow path downstream of the fire tube boiler, so that the flow therethrough is downwardly from top to bottom for permitting relative self-cleaning thereof and at the same time for limiting the deposition thereat of dusts flowing therethrough from the fire tube boiler, and a chimney downstream of the economizer for discharge of fumes from the flow path.

11. System of claim 10, wherein a preheater for preheating the combustion air for the burner is arranged in the second vertical flow portion of the flow path downstream of the economizer and upstream of the chimney, so that the flow therethrough is downwardly from top to bottom for permitting relative self-cleaning thereof and at the same time for limiting deposition thereat of dusts flowing downwardly therethrough from the fire tube boiler and economizer.

12. System of claim 11, wherein the economizer and preheater are arranged in staggered relation in the second vertical flow portion of the flow path for enhancing the relative self-cleaning thereof and at the same time for enhancing the limiting of the deposition thereat of dusts flowing downwardly therethrough from the fire tube boiler.

13. System of claim 10, wherein an electric energy converter is provided for converting the heat energy of the superheated steam into electric energy when so desired, including a steam turbine arranged for receiving superheated steam from the superheater, an alternator operatively connected with the turbine for generating electric energy, and a steam condenser and a degasser operatively connected with the turbine for receiving spent steam therefrom for condensing and recovering the water content thereof and operatively connected with the economizer and steam separator for passing the condensed water content through the economizer and then recycling the same to the thermal unit via the steam separator.

14. System for recovering latent and sensible heat of effluent gases from a cupola for cast iron production or from other similar melting installation consequent intermittent operation thereof, for obtaining heat energy or potential electric energy in the form of hot water and/or steam, which comprises a thermal unit and superheater for producing superheated steam capable of converting the heat energy into electric energy, the thermal unit including a combustion air burner and a combustion chamber arranged for burning such effluent gases with combustion air to form hot combustion gases therefrom, two vertical waste heat boilers arranged for independent heat recovery operation and disposed in series along a flow path successively downstream of the burner and combustion chamber for receiving in turn the hot combustion gases from the combustion chamber, the first of said boilers being of the water tube type having vertically arranged water tubes and the second of said boilers being of the fire tube type having vertically arranged fire tubes, and the flow path having a first vertical flow portion containing such water tubes, a second vertical flow portion containing such fire tubes and an intermediate upper interconnecting transitional reverse flow portion between the first and second vertical flow portions for thereby permitting the hot combustion gases flowing along the flow path through the two boilers to flow in an upward direction from bottom to top in the water tube boiler so as to lick the water tubes thereof, thence through the upper intermediate reverse flow portion and in turn to flow in the downward direction from top to bottom in the fire tube boiler so as to enhance the self-cleaning of the fire tubes thereof, and a common external steam separator installed above the two burners and in remote spaced relation to the flow path and operatively respectively connected to the two boilers for correspondingly receiving steam therefrom and returning water thereto, the superheater being in the form of a steam superheater operatively connected to the steam separator and having vertically arranged superheater tubes installed in the flow path upstream of the fire tube boiler.

* * * * *